(12) United States Patent
Fosbol et al.

(10) Patent No.: US 8,932,467 B2
(45) Date of Patent: Jan. 13, 2015

(54) METHOD AND A SYSTEM FOR THE PRETREATMENT OF LIGNOCELLULOSIC MATERIAL

(75) Inventors: Peder Fosbol, Søndersø (DK); Palle Hansen, Søndersø (DK)

(73) Assignee: Haarslev A/S, Søndersø (DK)

( * ) Notice: Subject to any disclaimer, the term of this patent is extended or adjusted under 35 U.S.C. 154(b) by 654 days.

(21) Appl. No.: 12/668,259

(22) PCT Filed: Jul. 24, 2008

(86) PCT No.: PCT/DK2008/000276
§ 371 (c)(1),
(2), (4) Date: May 4, 2010

(87) PCT Pub. No.: WO2009/012779
PCT Pub. Date: Jan. 29, 2009

(65) Prior Publication Data

US 2010/0216202 A1    Aug. 26, 2010

(30) Foreign Application Priority Data

Jul. 25, 2007  (DK) ................................ 2007 01086
Jul. 25, 2007  (DK) ................................ 2007 01087

(51) Int. Cl.
*B01D 17/00*           (2006.01)
(Continued)

(52) U.S. Cl.
CPC ... *C13K 1/02* (2013.01); *C13K 1/04* (2013.01);
(Continued)

(58) Field of Classification Search
CPC ......... Y02E 50/10; Y02E 50/16; Y02E 50/17;
C12P 7/08; C12P 7/10; C12P 2201/00;
C12P 2203/00; B01D 17/00; B01D 43/00;
C02F 1/025; C02F 2103/36; C02F 1/72;
C12M 45/00; C12M 45/06; C12M 45/09;
F16K 31/12; F16K 31/64
USPC ......... 210/632, 770, 773, 774, 761, 804, 805,
210/806, 808, 758; 422/208, 234, 242, 600,
422/620, 624, 630, 642, 643, 646, 649;
100/37, 38; 127/34–37; 435/132–136,
435/161–165, 819; 44/301, 302, 307, 589,
44/590, 605; 137/1, 12; 251/12
See application file for complete search history.

(56) References Cited

U.S. PATENT DOCUMENTS 4,425,433 A      1/1984  Neves
(Continued)

FOREIGN PATENT DOCUMENTS

EP          1130085 A      9/2001
(Continued)

OTHER PUBLICATIONS

International Search Report.

*Primary Examiner* — Joseph Drodge
(74) *Attorney, Agent, or Firm* — William J. Sapone; Ware Fressola; Maguire & Barber LLP

(57) ABSTRACT

The invention relates to a method and a system for the pretreatment of lignocellulosic material by thermal hydrolysis, in particular with a view to producing bioethenol, wherein the material is first admixed with water and is then passed to a reactor, in which the soaked material is subjected to a high temperature and a high pressure to such an extent that is it accessible for a subsequent treatment with enzymes, following which the treated material is separated into liquid part and a solid part, where the solid component is subsequently used for the production of bioethenol and enzymation and fermentation. Exclusively steam is used in the method and the corresponding system for heating, stirring and transport, as e.g. the transport through the various elements of the system is provided by a pressure difference between the compartments of the elements. The material (32) is discharged to an economizer (4), in which a separator (5) separates the material into a solid part and a liquid part. The solid part (29) is discharged for use in the further process. The method is performed as a two step proceed, as the material (32) from the first reactor (3) is injected into the economizer (4) and from there further on (26) to an additional reactor (8) for an additional treatment step. A high efficiency is achieved, as all pressures are established by direct steam addition, and heating surfaces and mechanical elements, such as pumps, stirrers, stuffing boxes, bearings, etc. are avoided. The use of economizers (4, 9) improves the consumption of energy relative to previously known processes.

13 Claims, 2 Drawing Sheets

Figure 1:
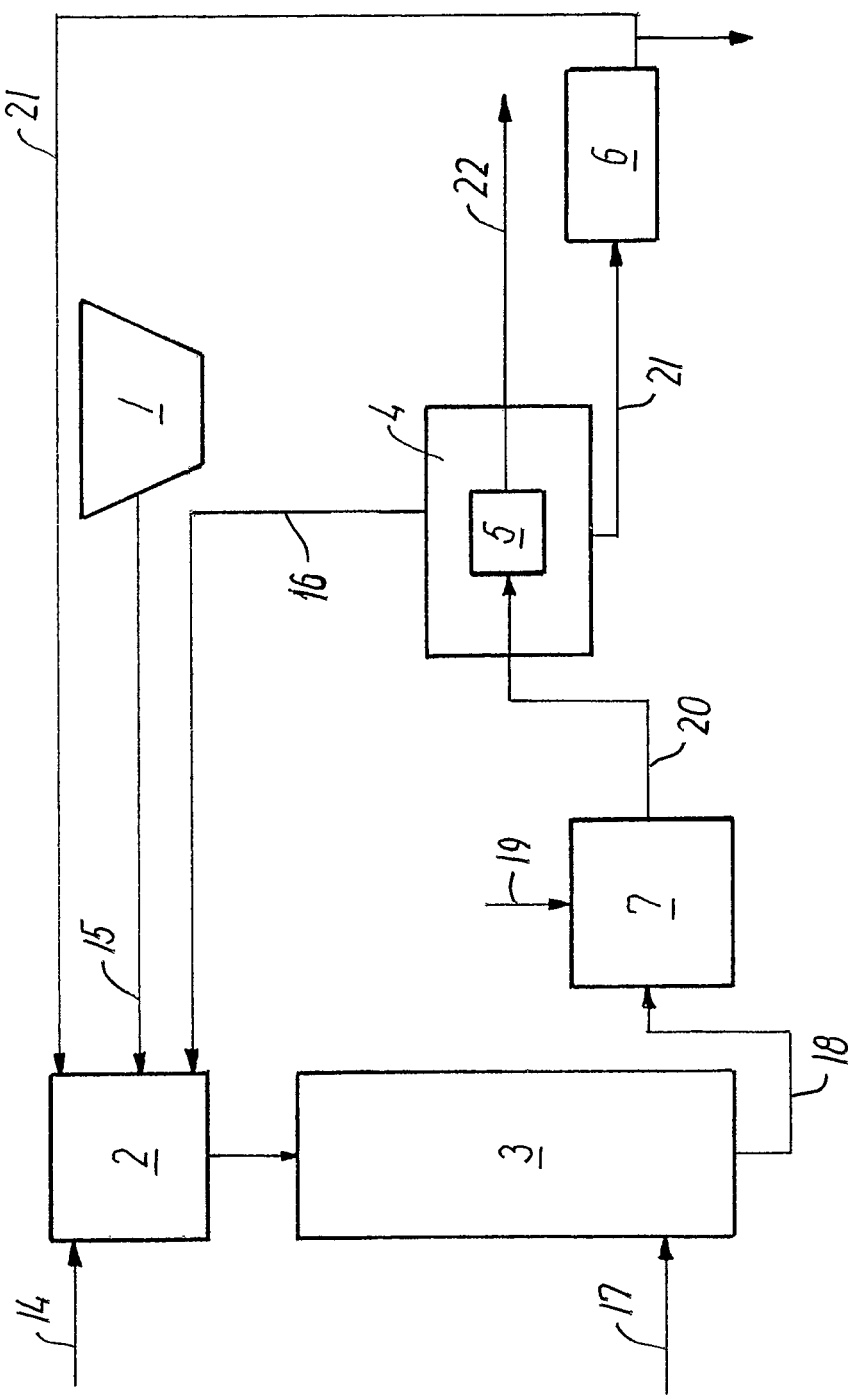

(51) Int. Cl.
*B01D 43/00* (2006.01)
*C02F 1/72* (2006.01)
*C12P 7/08* (2006.01)
*C12P 7/10* (2006.01)
*C12M 1/40* (2006.01)
*C13K 1/02* (2006.01)
*C13K 1/04* (2006.01)

(52) U.S. Cl.
CPC ............................................. *Y02E 50/16* (2013.01)
USPC .............. 210/632; 44/307; 44/605; 210/761; 210/770; 210/774; 210/806; 210/808; 127/37; 435/136; 435/165

(56) References Cited

U.S. PATENT DOCUMENTS

| | | | |
|---|---|---|---|
| 4,461,648 A * | 7/1984 | Foody | 127/37 |
| 5,171,592 A * | 12/1992 | Holtzapple et al. | 426/69 |
| 5,536,325 A * | 7/1996 | Brink | 127/43 |
| 5,862,612 A * | 1/1999 | Bielfeldt | 34/398 |
| 6,228,177 B1 * | 5/2001 | Torget | 127/37 |
| 6,419,788 B1 * | 7/2002 | Wingerson | 162/14 |
| 6,555,350 B2 * | 4/2003 | Ahring et al. | 435/162 |
| 7,754,456 B2 * | 7/2010 | Penttila et al. | 435/165 |
| 7,988,788 B2 * | 8/2011 | Hilst | 127/37 |
| 8,017,820 B2 * | 9/2011 | Foody et al. | 585/242 |
| 8,123,864 B2 * | 2/2012 | Christensen et al. | 127/37 |
| 2004/0231661 A1 * | 11/2004 | Griffin et al. | 127/1 |
| 2005/0069998 A1 * | 3/2005 | Ballesteros Perdices et al. | 435/161 |
| 2005/0274308 A1 * | 12/2005 | Copeland et al. | 110/346 |

FOREIGN PATENT DOCUMENTS

| | | |
|---|---|---|
| WO | WO00/20678 A | 4/2000 |
| WO | WO00/73575 A | 12/2000 |
| WO | WO03/013714 A | 2/2003 |
| WO | WO03/071025 A | 8/2003 |
| WO | WO2007/009463 A | 1/2007 |
| WO | WO2008/050740 A | 5/2008 |

* cited by examiner

METHOD AND A SYSTEM FOR THE PRETREATMENT OF LIGNOCELLULOSIC MATERIAL

THE PRIOR ART

The invention relates to a method of pretreating lignocellulosic material by thermal hydrolysis, in particular with a view to producing bioethanol, wherein the material is first admixed with water and/or aqueous liquid and is then passed to a reactor, in which the soaked material is subjected to a high temperature and a high pressure to such an extent that it is accessible for a subsequent treatment with enzymes, following which the treated mate-vial is separated into a liquid part and a solid part, wherein the liquid part and the solid part may subsequently be used for the production of bioethanol by enzymation and fermentation. The invention moreover relates to a system for performing the method.

Cellulose and hemicellulose, which are treated with enzymes, may hereby be decomposed to $C_6$ and $C_5$ sugar, which may subsequently be used as a substrate for microorganisms, for the production of bioethanol.

To make this material accessible to the enzymes, it may be pretreated e.g. by a thermal hydrolysis which is capable of opening the structure of the material.

One of the known methods of thermal hydrolysis uses a reactor, in which the material is subjected to a high temperature and a high pressure. After a short or long period of time under these conditions, the material is discharged and is ready for use. Typically, the material is subjected to a pressure in the range of 6-30 bars. The retention time in the reactor is typically from 5 to 120 minutes, depending on the pressure and the temperature of the reactor. The treatment in the reactor takes place batch-wise.

Thus, the known methods and systems require heating of the reactor and means for stirring and for transporting the material in the form of e.g. mechanical stirrers and pumps. This involves high costs for the provision and maintenance of the rotating parts, stuffing boxes, joints, etc.

WO 2007/009463 describes a system for the production of bioethanol, which includes a part for the pretreatment of the material by thermal hydrolysis. In this system, the material in the reactor is subjected to a temperature of between 170 and 230 degrees C. and to a suitably high pressure, and the time in the reactor, the pressure and the temperature are selected such that a suitable part of the cellulose is maintained in the fibre fraction.

THE OBJECT OF THE INVENTION

The invention relates to a method of performing this thermal hydrolysis of the above-mentioned type, wherein mechanical conveyor means and mechanical sealing means, stuffing boxes and bearings are avoided completely.

This is achieved according to the invention by a method, wherein exclusively steam is used in the heating, stirring and transport of the material through the steps of the pretreatment, wherein the material is admixed with water or aqueous liquid, is passed to the reactor through a vessel, which may be closed, following which steam is supplied to the vessel at a pressure which is higher than the pressure in the reactor, following which the material in the reactor is subjected to steam which is introduced through nozzles, optionally at several levels, following which the finished material is separated into a solid part and a liquid part in a separator, and wherein the solid part is discharged for further treatment, while the liquid part is optionally collected or recirculated. Hereby, the production is carried out like in a continuous process, which gives a high efficiency.

In this process, exclusively steam is used for the transport, stirring and heating. Discharge and transport from one element to another are caused by the pressure differences between the compartments of the elements, Thus, the system has no mechanical elements, such as pumps, stuffing boxes or bearings, and it has no external heating. A considerable amount of the energy is recovered from the used steam by means of an economizer, The steam may be used directly in the mentioned vessel for introduction into the reactor.

The method may be made even more effective by using an oxidation reactor between the reactor and the economizer.

Further, the method may be made economical and effective by being performed in two steps, as an additional reactor and an additional economizer are used. The material, which is finished in the first reactor, is supplied to the additional reactor from the economizer, in which it is treated once more. The material from this is then discharged to the additional economizer, from which it is again separated into a solid part and a liquid part. The solid part is removed for further treatment in the process (with enzymes).

Moreover, the invention relates to a system for performing the method with the components which are described hereafter.

THE DRAWING

Figure 2:
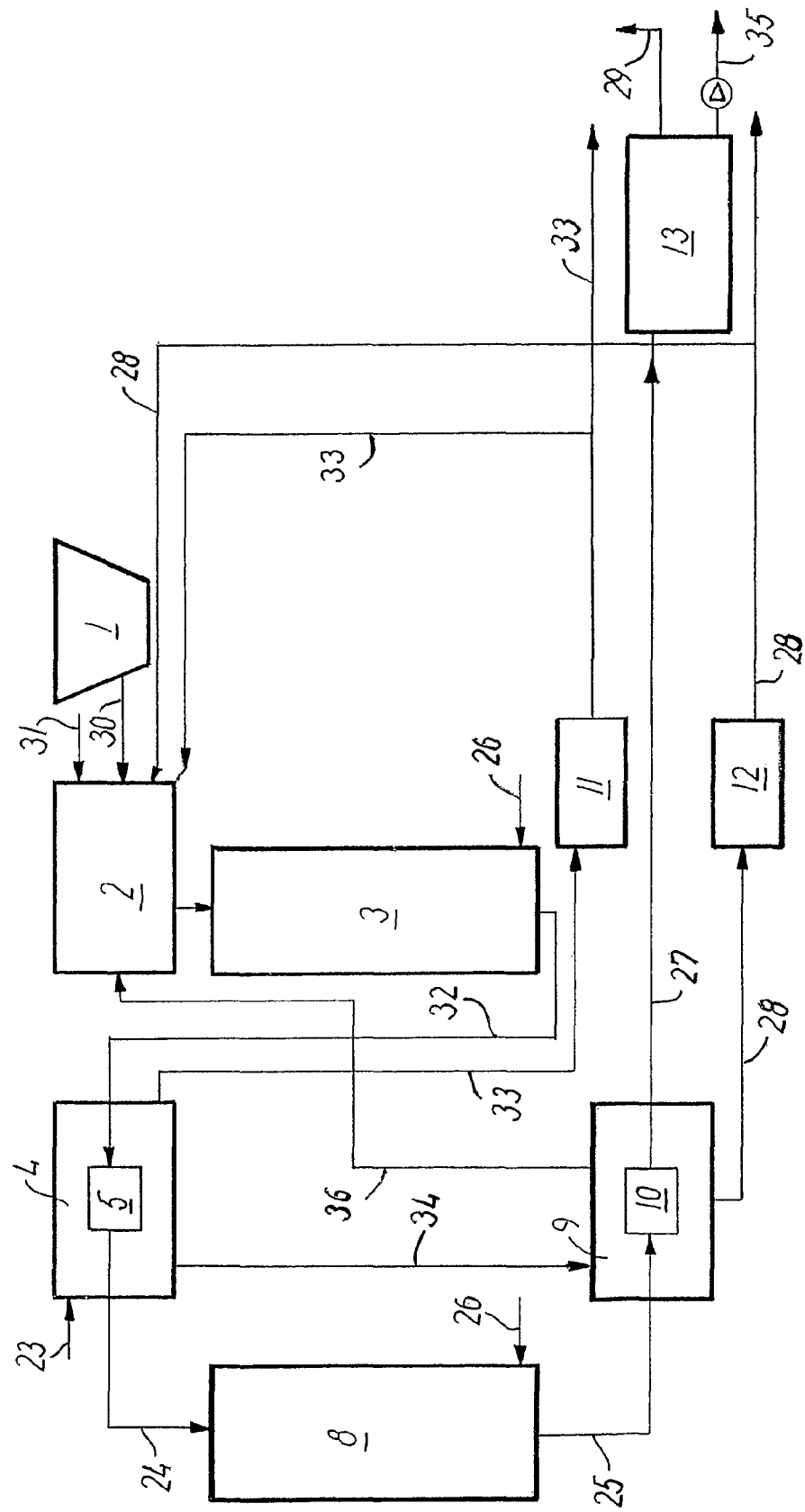

The invention will now be explained more fully with reference to the drawing, in which FIG. 1 schematically shows a system according to the invention, in which the process takes place in one step, FIG. 2 schematically shows a system in which the process takes place in two steps.

DESCRIPTION OF EXEMPLARY EMBODIMENTS

FIG. 1 schematically shows a system for performing the method in one step. Water is added to the lignocellulosic material in a vessel 1. The mixture 15 is transported into the reactor 3 of the system through an inlet vessel 2. The vessel 2 is closed off from the vessel 1 after having received the mixture 15. Recirculated liquid 21 from the process may optionally be supplied from a collection container 6 to the vessel 2, to which waste steam 16 from art economizer 4 is moreover added. Then, steam 14 is applied from a steam generator (not shown) at a pressure which is 1-5 bars higher than the pressure in the reactor 3. When the desired pressure has been obtained, the material is injected into the reactor 3.

Steam 17 is introduced into the reactor 3 through nozzles which are arranged at the bottom and optionally at several levels up along the reactor. The reactor is upright, and the product moves downwards, preferably as a piston flow. The treated product 18, 20 is discharged from the reactor 3 to the economizer 4 of the system. The pressure in the economizer is at least 1 bar lower than the pressure in the reactor, so that this pressure difference enables the discharge. A separator 5, in which liquid 21 is separated, is disposed in the economizer 4. The liquid 21 is discharged from the economizer 4 to a collection container 6, from which it may optionally be reused. Then, the solid part 22 is discharged from the system for further treatment.

The process is then repeated with a new batch of material.

The pressure in the reactor 3 will typically be in the range 6-30 bars, the temperature typically in the range 159-233 degrees C. and the retention time between 5 and 120 minutes.

The solid part 22 typically contains 10-40% dry matter. The relatively high dry matter percentage reduces the need for energy for optional drying. Correspondingly, the liquid part contains 2-8% dry matter.

If it is an advantage, acid or base may be added to the constituent raw material.

Oxygen 19 may be added in the reactor 3 or a separate reaction container 7, In most cases, the discharged solid parts 22 must be cooled, so that they may be treated further in subsequent process steps, which include enzymation and fermentation. This may be done in a simple manner by vacuum cooling down to a temperature which is optimum for the further process step. if it is possible to utilize low temperature steam, a very effective reuse of the added energy is moreover achieved. The low temperature steam may be used in an evaporator, in which e.g. liquid flows, which are taken out of the system, may be concentrated. The product may e.g. be taken out of the cooler by a positive pump. The vacuum cooler may have an operating temperature of 50-80 degrees C., which results in a considerable recovery of flash steam. The vacuum cooler may be used down to a temperature of 25 degrees C.

FIG. 2 schematically shows the method and the system in a two step process.

In the two step process, an additional reactor 8 is used, to which the material 24 is supplied from the economizer 4 in the first step. Liquid parts may be taken out of the system between the two reactors 3, 8, whereby the contents of salts and inhibitors are reduced.

Steam 23 is applied to the economizer 4 at a pressure which is 1-5 bars higher than the pressure in the additional reactor (reactor 8), following which the material is injected into the reactor 8 solely by the pressure difference. Steam 26 is introduced into the reactor 8 through nozzles which are arranged at the bottom and optionally at several levels. The product is injected into an additional economizer 9 in the same manner as in the first step, in which the pressure is at least 1 bar lower than in the reactor 8. Also the economizer 9 has a separator 10 for separating the solid part from the liquid part.

The pressure in the reactor 3 will typically be in the range 6-20 bars, white the pressure in the reactor 8 is typically held at 6-30 bars. The pressure in the reactor 8 will typically be 1-20 bars higher than the pressure in the reactor 3.

The pressure in the economizer 4 is at least 1 bar lower than the pressure in the reactor 3. A separator 5, 10, in which liquid is separated, is disposed internally in the economizer 4, 9. Liquid 28, 33 is discharged from the economizer 4 and 9 to the container 11 and 12. Steam 23 is applied at a pressure which is 1-5 bars higher than the pressure in the reactor 8. When the desired pressure has been obtained in the economizer 4, the product 24 is injected into the reactor 8, while waste steam 34, if any, is supplied to the economizer.

In most cases, the discharged solid phases must be cooled, so that they may be treated further in subsequent process steps, which include enzymation and fermentation. This may be done in a simple manner by means of a vacuum cooler 13 down to a temperature which is optimum for the further process step. If it is possible to use low temperature steam, a very effective reuse of the added energy is moreover achieved. The low temperature steam may be used in an evaporator, in which e.g. liquid flows, which are taken out of the system, may be concentrated. The product 27 may e.g. be taken out as a solid 35 from the cooler 13 by a positive pump.

Such a cooling system as an option is shown for the two step process in FIG. 2. The vacuum cooler 13 may have an operating temperature of 50-80 degrees C., which results in a considerable recovery of flash steam 29. The vacuum cooler 13 may advantageously be used down to a temperature of 25 degrees C. Such a vacuum cooler solution may likewise be established in connection with the one step system shown in FIG. 1.

If addition of oxygen is used, it will preferably take place to the reactor 3, as shown in FIG. 1, or to an oxidation reactor between the reactor 8 and the economizer 9.

Method and system advantages may be summarized as follows:

The process according to the invention takes place in a system in which the pressure is established by direct steam addition. The pressure in the system varies so that all transport is established by pressure differences, whereby the system is simplified considerably relative to traditional embodiments. Thus, heating surfaces and thereby cleaning procedures for these are avoided. Stirring is established by direct injection of steam, but such that the hydrolysis process proceeds down through the reactor, as the product is advanced preferably in a piston flow. Mechanical devices for stirring and transport are avoided hereby, and bearings and stuffing boxes are unnecessary.

Liquid may be separated and taken out in the economizers of the system. A larger or smaller part may be recirculated to the constituent raw material. Thus, salts and inhibitors may be separated by this separation. When the system is constructed as a two step process, liquid may be taken out of the system at a relatively high and a relatively low steam pressure. In addition, the hydrolysis process may be regulated so that the intensity may be controlled via variation of partly pressure/temperature in the two reactor steps, partly of the retention time at the fixed pressures.

The system makes it possible to use waste steam, and the total consumption of steam is therefore reduced relative to systems without an economizer.

The system allows adaptation to alternative processes, e.g. hydrolysis by acid addition or alkaline wet oxidation and everything in combination with a final steam explosion.

The system moreover allows the solid part, which is taken out of the system, to be cooled in a simple manner by vacuum cooling to a temperature which is suitable for the further process course.

The invention claimed is:

1. A method of pretreating a lignocellulosic material by thermal hydrolysis, the pretreated material being accessible for a subsequent treatment with enzymes, the pretreated material being suitable for producing bioethanol by enzymation and fermentation, the method exclusively using steam for heating, mixing and transporting the material through each pretreating step, the method comprising the steps of:
    admixing the lignocellulosic material with water and/or an aqueous liquid to form a soaked material;
    transporting the soaked material to a vessel,
    closing off the vessel and supplying steam to the vessel, to raise a pressure in the vessel to a first pressure, and then discharging the soaked material from the vessel, using steam exclusively for transporting the soaked material to a reactor as the first pressure is higher than a pressure in the reactor,
    introducing steam to the reactor through one or more nozzles for subjecting the soaked material to a high temperature and a high pressure to such an extent that the lignocellulosic material is prepared and becomes more accessible to enzymes for a subsequent treatment therewith, using exclusively the high pressure of the steam in the reactor for transporting the prepared lignocellulosic material to a separator maintained at a second pressure lower that the reactor pressure, separating the prepared material into a liquid part and a solid part in the separator, the solid part containing the pretreated material accessible for a subsequent treatment with enzymes, and, using exclusively the second pressure for discharging the solid part and the liquid part to locations maintained at pressures lower than the second pressure, such that transporting through each step occurs exclusively by steam generated pressure differences.

2. The method of claim 1 wherein the solid part is discharged for further treatment, and the liquid part is collected and/or recirculated to the vessel for addition to the soaked material.

3. The method according to claim 1, further comprising providing an economizer and incorporating the separator therein.

4. The method according to claim 3, further comprising generating waste steam in the economizer and passing the waste steam to the vessel.

5. The method according to claim 1 further comprising:
prior to transporting to the separator, using exclusively the high pressure of the steam in the reactor for transporting the prepared lignocellulosic material to an oxidation reactor maintained at a pressure lower that the reactor pressure;
adding oxygen to the prepared lignocellulosic material; and,
using exclusively the pressure in the oxidation reactor for transporting the prepared oxygenated lignocellulosic material to the separator maintained at the second pressure which is lower that the oxidation reactor pressure.

6. A method of pretreating a lignocellulosic material by thermal hydrolysis, the pretreated material being accessible for a subsequent treatment with enzymes, the pretreated material being suitable for producing bioethanol by enzymation and fermentation, the method using steam exclusively for heating, mixing and transporting the material through each pretreating step, the method comprising the steps of:
admixing the lignocellulosic material with water and/or an aqueous liquid to form a soaked material;
transporting the soaked material to a vessel,
closing off the vessel and supplying steam to the vessel, to raise a pressure in the vessel to a first pressure, and then discharging the soaked material from the vessel, using steam exclusively for transporting the soaked material to a first reactor as the first pressure is higher than a pressure in the reactor,
introducing steam to the reactor through one or more nozzles for subjecting the soaked material to a high temperature and a high pressure to such an extent that the lignocellulosic material becomes more accessible to enzymes for a subsequent treatment therewith, using exclusively the high pressure of the steam in the reactor for transporting the prepared lignocellulosic material to a first separator maintained at a second pressure lower that the reactor pressure, separating the prepared material into a liquid part and a solid part in the first separator, applying steam to the first separator to raise the second pressure thereof for using the steam exclusively for transporting the solid part from the first separator to a second reactor maintained at a pressure lower than the second pressure, introducing steam to the second reactor for subjecting the solid part to a high temperature and a high pressure to such an extent an additional portion of the prepared lignocellulosic material contained in the sold part becomes accessible to enzymes, then using exclusively the pressure of the steam in the second reactor for transporting the prepared lignocellulosic material to a second separator maintained at a third pressure lower that the second reactor pressure, separating the prepared material into a second liquid part and a second solid part in the second separator, the second solid part containing the pretreated material accessible for a subsequent treatment with enzymes, and, using exclusively the third pressure for discharging the second solid part and the liquid part to locations maintained at pressures lower than the third pressure, such that transporting through each step occurs exclusively by steam generated pressure differences.

7. The method according to claim 6, further comprising:
adding oxygen to the prepared lignocellulosic material in the first reactor.

8. The method according to claim 6, further comprising:
providing an economizer and incorporating the first separator therein.

9. The method according to claim 8, further comprising providing a second economizer and incorporating the second separator therein.

10. The method according to claim 9, further comprising generating waste steam in the second economizer and passing the waste steam to the vessel.

11. The method according to claim 9, further comprising generating waste steam in the economizer and passing the waste steam to the second economizer.

12. The method according to claim 6 further comprising discharging the liquid part from the first separator to a container for collection or recycling to the vessel.

13. The method according to claim 6 further comprising discharging the liquid part from the second separator to a container for collection or recycling to the vessel.

* * * * *